Feb. 3, 1970   R. H. MacKAY   3,493,725
TRANSPORTABLE AND HEATED CONTAINER FOR DISH ELEVATOR
Filed March 15, 1967   2 Sheets-Sheet 1

INVENTOR
ROBERT H. MacKAY
by JEFFERS & YOUNG
ATTORNEYS

Feb. 3, 1970  R. H. MacKAY  3,493,725
TRANSPORTABLE AND HEATED CONTAINER FOR DISH ELEVATOR
Filed March 15, 1967  2 Sheets-Sheet 2

INVENTOR
ROBERT H. MacKAY
by JEFFERS & YOUNG
ATTORNEYS

United States Patent Office 3,493,725
Patented Feb. 3, 1970

3,493,725
TRANSPORTABLE AND HEATED CONTAINER FOR DISH ELEVATOR
Robert H. MacKay, Fort Wayne, Ind., assignor to Lincoln Manufacturing Company, Inc., Fort Wayne, Ind., a corporation of Indiana
Filed Mar. 15, 1967, Ser. No. 623,332
Int. Cl. F27d *11/00*
U.S. Cl. 219—385                                                   1 Claim

ABSTRACT OF THE DISCLOSURE

A container for a spring biased dish elevator is formed by a cylinder having inner and outer walls, a removable bottom, and a sealed electrical heater between the cylinder walls. The cylinder is removably inserted in an opening in a surface, and is supported on the surface by a flang around the outside of the top of the cylinder. The cylinder may also be supported on a platform at the bottom of the cylinder. The surface and platform may be part of a transportable cart.

BACKGROUND OF THE INVENTION

My invention relates to a transportable and heated container for a dish elevator, and particularly to such a container that can be disassembled to permit the container and dish elevator to be completely cleaned and sterilized.

Dish elevators are used in food serving and food preparing institutions to provide a compact storage area for dishes, and at the same time to make the dishes readily available to users. Previously, such dish elevators have usually been positioned in a fixed location, and have usually been unheated. When a dish elevator becomes empty, clean dishes are usually brough from the washing area to the dish elevator and stored in the elevator. Usually, the dishes are carried by hand, or are carried on a cart. If the dishes are carried on a cart, they must be unloaded from the cart and placed in the dish elevator. Such handling requires additional labor. Further, such handling increases the possibility of the dishes becoming soiled or contaminated.

Accordingly, an object of my invention is to provide a transportable container for a dish elevator which permits the dishes to be loaded directly from the washing area into the elevator, after which they can be easily transported to the area where they are to be used.

Another object of my invention is to provide an improved container for a dish elevator, the container being transportable and reducing the handling and contamination of the dishes.

Frequently, dishes may be stored in a dish elevator for an appreciable length of time before they are used. During this time, the dishes may become cold, with the result that when a dish is used with hot food, the food is cooled more quickly. This results in less satisfied customers or diners.

Accordingly, another object of my invention is to provide an improved transportable container for a dish elevator which can be provided with heat for the dishes stored in the elevator.

Where dish elevators are fixed in location, it is generally inconvenient to wash the dish elevators as frequently as is desirable or necessary. This is because it is difficult to carry the dish elevators to the washing area. Even if the elevators are taken to the washing area, it is difficult or impossible to disassemble the dish elevators in order that they can be thoroughly and completely cleaned.

Accordingly, another object of my invention is to provide an improved container for dish elevators that is transportable and that can be easily disassembled for cleaning.

Another object of my invention is to provide an improved dish elevator container that is transportable, that permits the elevator to be removed so that the elevator and container can be easily cleaned, and that can be heated in order to maintain the stored dishes at a warm temperature.

SUMMARY OF THE INVENTION

Briefly, these and other objects are achieved in accordance with my invention by a cylindrically shaped container having an inner wall and an outer wall which are sealed at the top and bottom to provide a watertight construction. An electrical heating element is positioned between the inner and outer walls, and is provided with suitable electrical connections. The entire bottom of the cylindrical container is closed by a removable bottom. The top of the cylindrical container is provided with an outwardly extending flange. This flange permits the container to be inserted through a circular opening in a surface or platform and suported on its flange. A dish elevator, which may be the conventional spring bias type, is inserted in the top opening of the container to provide a platform for dishes. A cart may be provided to transport one or more of the cylindrical containers with its elevator. Such a cart may be provided with a lower bottom portion for supporting the bottom of the containers, and with an upper surface having the appropriate number of cylindrical openings for receiving the containers. When the cart is to be loaded with dishes, it can be easily rolled to the washing area. The dishes are loaded into the elevator or elevators, and the cart is rolled to the area where the dishes are to be used. The dishes may be heated by connecting the heater element to a suitable source of power. The dish elevator and the container may be easily disassembled to permit their being thoroughly cleaned and sterilized.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
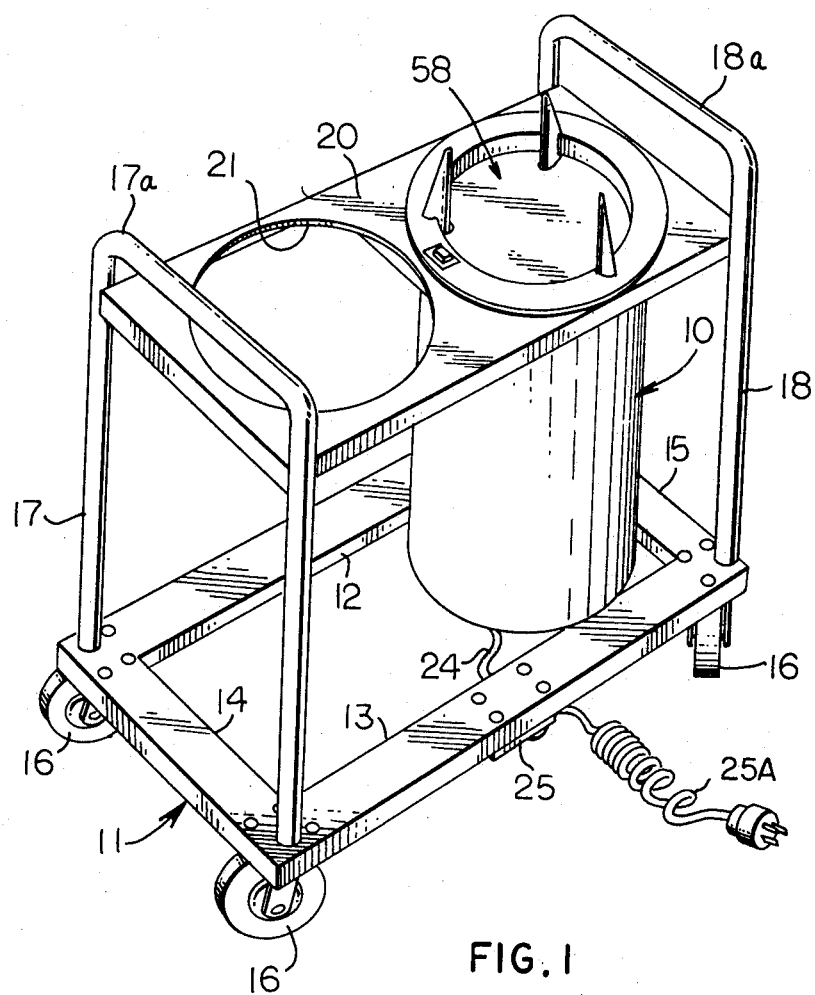
FIGURE 1 shows a perspective view of a cart and a heated container in accordance with my invention, and a dish elevator positioned in the container.

FIGURE 1 shows a transportable and heated cylindrical container 10 in accordance with my invention. I have shown the container 10 mounted on a cart by dolly 11, but it is to be understood that the container 10 can be transported on many types of devices. The cart 11 is constructed of two longitudinal side pieces 12, 13 joined to two transverse end pieces 14, 15. The bottom formed by these pieces 12, 13, 14, 15 is mounted on suitable wheels or casters 16. An opening is left between the bottom pieces 12, 13, 14, 15 in order to conserve weight and material. Two U-shaped end posts 17, 18 are mounted at the ends of the bottom, and extend upwardly. These end posts 17, 18 support an upper horizontal surface 20 which is positioned near the top of the end posts 17, 18 and secured thereto by either permanent fastening means or removable fastening means. The posts 17, 18 include horizontal handle portions 17a, 18a at their upper ends which facilitate moving or pushing the cart 11. The horizontal surface 20 is provided with two circular openings 21, only one of which is visible in FIGURE 1 because the container 10 is located in the other opening. While the cart 11 is shown with two openings, it is to be understood that the cart 11 may have only one opening, or may have more than two openings. In FIGURE 1, it will be seen that the container 10 is positioned in the opening, and that its upper portion rests on the surface 20 and its lower portion or bottom rests on the bottom pieces 12, 13, 15. The container 10 is heated by a heater element which is provided with an electrical connection 24. This connection 24 is connected or plugged into a receptacle 25 mounted on the side piece 13. The receptacle may be connected to a conventional wall outlet through a connection 25A.

Figure 2:
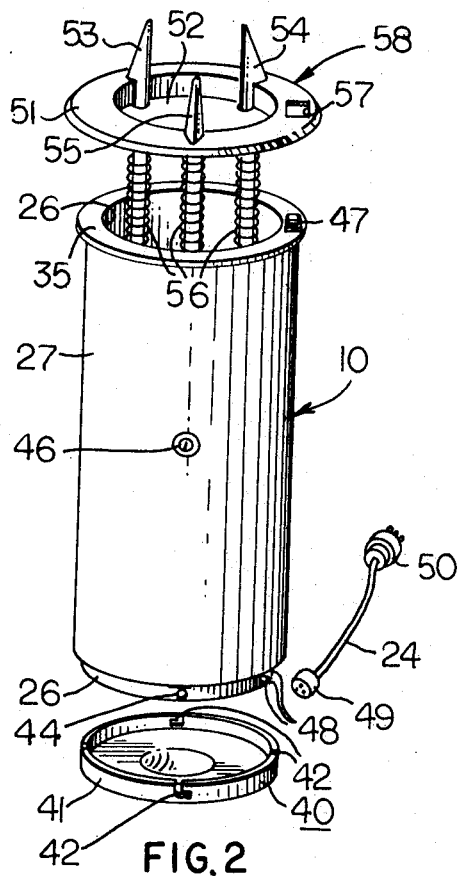
FIGURE 2 shows a perspective view of the container in accordance with my invention with the container bottom and the dish elevator in partially disassembled condition.
Figure 3:
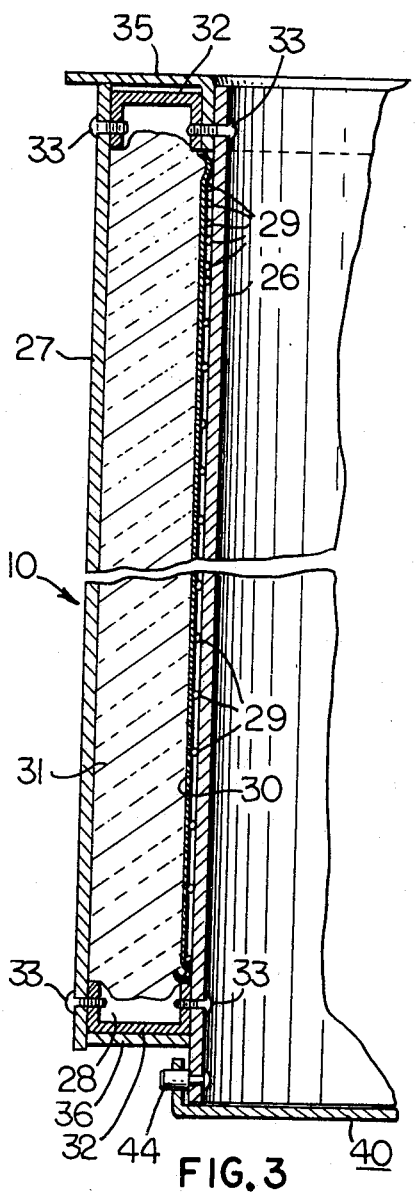
FIGURE 3 shows a cross-sectional view through one side of the container.

FIGURE 2 shows a perspective view of my container 10 with portions disassembled to show the assembly of the container 10, and FIGURE 3 shows a radial cross-sectional view through one wall portion of the container 10. The container 10 is constructed of two cylindrical tubes 26, 27 which are preferably constructed of stainless steel or other durable and sealable material. The tube 26 has a smaller diameter than the tube 27, and is positioned concentrically within the tube 27 as shown in FIGURE 3 to form a space 28 which receives a heating element 29 and insulating material 31. The insulating material 31 is preferably fiberglass or some similar insulating material which is electrically insulating, and which is fairly heat resistant. The two tubes 26, 27 are joined and held in concentric relation by a plurality of U-shaped brackets 32 which are positioned at spaced intervals between the two tubes 26, 27 around the top and bottom portions. These brackets 32 may be joined to the tubes 26, 27 by any suitable means such as the screws 33 shown, or by welding or by rivets. In one embodiment actually constructed, I have found that four brackets 32 spaced 90 degrees around the top and four brackets 32 spaced 90 degrees around the bottom provide sufficient support for the tubes 26, 27, and also permit access to the space 28 during construction. The space 28 between the tubes 26, 27 is closed (in a preferably water-tight manner) at the top by a flange member 35 which extends horizontally over and outwardly beyond the outer tube 27, and which extends downward alongside the outer surface of the inner tube 26. The space 28 between the tubes 26, 27 is closed (in a preferably water-tight manner) at the bottom by a ring 36 which is fastened between the two tubes 26, 27 by any suitable means such as welding. In FIGURES 2 and 3, it will be noted that the inner tube 26 extends downward below the outer tube 27. This extended portion of the inner tube 26 is provided in order to attach a bottom cover 40 to the lower portion of the inner tube 26 and close the inner tube at the bottom of the container 10. The cover 40 is shown in FIGURE 2, and is circular in shape with an upright rim or flange 41. The rim or flange 41 is provided with locking notches 42 which engage lugs 44 extending outwardly from the inner tube 26 at its lower extended portion. The cover 40 is provided with a handle (not visible in the drawing) beneath its circular portion which permits the cover 40 to be placed over and around the inner tube 26 as shown in FIGURE 3 with the notches 42 engaging and surrounding the lugs 44. With the cover 40 pushed on the inner tube 26, it is rotated (clockwise as viewed in FIGURE 2) so that the notches 42 lock on the lugs 44 and hold the cover 40 on the inner tube 26.

Figure 4:
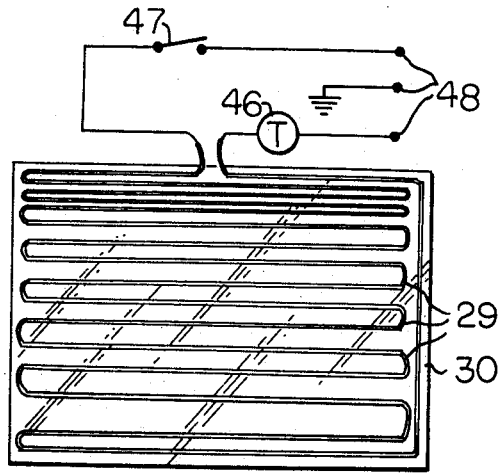
FIGURE 4 shows a view of the heater element used in the container before it is assembled.

The heating element 29 is comprised of insulated heater wires which are laid on a heavy foil of supporting material 30. The foil 30 may be comprised of aluminum foil which is approximately 0.037 inch thick. As shown in FIGURES 3 and 4, the heating element wires are spaced closer together at the top. I have found that this closer spacing at the top is desirable to concentrate the heat near the top, because more heat is lost from the contained 10 at its top. In addition, it is desirable that the uppermost dishes in the container 10 be the warmest, as they are the first to be used. The heater element wires are arranged as shown in FIGURE 4 and may be connected through a series heat responsive thermostat 46 and a single pole, single throw switch 47 to terminals or plugs 48. The circuit so connected is preferably brought outside of the container 10 as shown in FIGURE 2. The switch 47 is positioned on the top flange member 35 for easy access. I have shown three plugs 48 in FIGURES 2 and 4, one of which is a ground connection. The connection 24 includes a female type receptacle 49 and a male plug 50 which, as previously explained, connects to the receptacle 25. I prefer the heating elements 29 to be brought out of the male plugs 48 for connection by a female plug 49 because this arrangement permits complete removal of the electrical connection 24 from the container 10. However, it is to be understood that the electrical connection 24 may be permanently connected to the container 10.

FIGURE 2 also shows a dish elevator structure 58 which is constructed so that it can be inserted within the inner tube 26 and supported by the inner tube 26 and on the upper flange 35 by a flange 51. The structure 58 comprises a dish platform 52 which is supported between three posts 53, 54, 55 on springs 56. The structure 58 is known, and may take a number of different configurations as long as it fits within the inner tube 26 with its flange 51 supported on the flange 35 as shown in FIGURE 1. The flange 51 is provided with an opening 57 which permits the switch 47 to be accessible.

FIGURE 2 shows how my improved container 10 can be disassembled in order that the various components can be completely and thoroughly cleaned and sterilzed. The container 10 comprising the inner and outer tubes 26, 27 may be completely immersed in water or other liquid, as the heating element 29 is completely sealed. With the dish elevator structure 58 and the bottom 40 removed, all surfaces of the container 10 are easily accessible. After the container 10, the bottom 40, and the structure 58 have been cleaned, it may be readily reassembled as also shown in FIGURE 2, and placed in the opening 21 on the cart 11. FIGURE 1 shows the dish elevator structure 58 in assembled position in the container 10. The connection 24 may be made from the container 10 to the receptacle 25. Then, when the cart 11 with its container 10 is in position, the connection 25A may be inserted in a convenient wall socket or outlet.

It will thus be seen that my invention provides a new and improved container for a dish elevator. This container lends itself readily to being transported, provides heat for the dishes on the elevator contained, and may be readily dissassembled for complete and thorough cleaning. Persons skilled in the art will appreciate that modifications may be made to my invention. For example, my container 10 may have any size and relative dimensions. The dish elevator structure 50 may also take a number of sizes and configurations. Additional insulation 31 may be provided, and different configurations of the heating element 29 may be provided, although a closer spacing of the heater elements 29 at the top is preferred. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A transportable, heated container for a dish elevator comprising, in combination:
   (a) a cylindrical outer tube,
   (b) a cylindrical inner tube having a diameter less than the diameter of said outer tube and being positioned concentrically within said outer tube,
   (c) spacing means between said inner and outer tubes between their facing surfaces to hold said tubes in concentric relation,
   (d) a flange fastened to the upper end of said tubes for sealing the space between said tubes at said upper end, said flange terminating inwardly at said inner tube and extending outwardly beyond said outer tube to provide a support for said container,
   (e) said inner tube having a portion extending downwardly beyond said outer tube,
   (f) a removable cover provided with a number of notches closing said inner tube at the bottom thereof,
   (g) a number of lugs mounted on the outer surface of said downwardly extending portion of said inner tube receiving the notches disposed in said cover,
   (h) an insulated heating means positioned in said space between said tubes for distributing heat through said inner tube,
   (i) said heating means including a number of heater wires disposed adjacent the outer surface of said inner tube and substantially coextensive therewith, said heater wires being spaced closer together at the upper end of said inner tube to provide a greater amount of heat at said upper end,
   (j) a foil insulating sheet for supporting said heater wires in said spaced relation, insulating material positioned between said heater wires and the inner surface of said outer tube,
   (k) a closure member fastened to the lower end of said tubes for sealing said space at said lower end, said closure member terminating inwardly at said inner tube and terminating outwardly at said outer tube to permit said container to be inserted in a circular opening, and leads connected to said heater wires for providing external connections thereto.

References Cited

UNITED STATES PATENTS

| | | | |
|---|---|---|---|
| 3,351,741 | 7/1967 | Shelley | 219—385 |
| 756,242 | 4/1904 | Kuhn | 219—430 |
| 80,776 | 1868 | Smith | 220—40 |

BERNARD A. GILHEANY, Primary Examiner

DEWITT M. MORGAN, Assistant Examiner

U.S. Cl. X.R.

219—535; 312—71, 236